3,592,833
TRIS-(ORGANOSILYLMETHYL)-AMINES AND PRODUCTION THEREOF

Armand de Montigny, Leverkusen, Dietrich Golitz, Cologne-Stammheim, and Walter Simmler, Odenthal-Schlinghofen, Germany, assignors to Farbenfabriken Bayer Aktiengesellschaft, Leverkusen, Germany
No Drawing. Filed May 23, 1968, Ser. No. 731,647
Claims priority, application Germany, June 3, 1967, F 52,594
Int. Cl. C07f 7/02, 7/18
U.S. Cl. 260—448.8R  10 Claims

ABSTRACT OF THE DISCLOSURE

Novel tris-(organosilyl-methyl)-amines of the general formula

in which R is an alkyl radical having 1 to 4 carbon atoms and $n$ is 1, 2 or 3 and condensation products derived therefrom and corresponding to the general formula

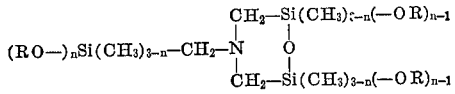

are useful intermediates, surfactants and primers. They are produced by introducing anhydrous ammonia into a solution of a bromomethyl-alkoxysilane of the general formula

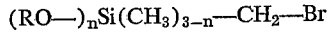

under atmospheric pressure, the solvent being a polar aprotonic compound the dielectric constant of which is greater than 25 at 20° C., preferably acetonitrile, effecting reaction between the ammonia and the silane at a temperature between —30° C. and the boiling point of the reaction mixture, and separating the trisamine from ammonium bromide and the solvent. Optionally, these tris-amines are hydrolyzed with water to give the above condensation products.

---

This invention relates to new organosilyl-substituted tertiary amines of the general formula

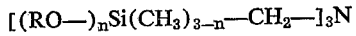

in which R is an alkyl radical having 1 to 4 carbon atoms and $n$ is 1, 2 or 3, to a process for their production, to their hydrolysis and condensation products, including intramolecular anhydrides, for example the 2,6-disilamorpholine derivates of the general formula

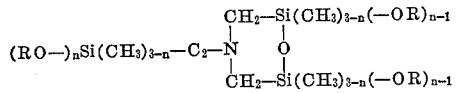

and to the polycondensates formed therefrom.

It is known, for example from U.S. patent specification No. 2,715,133, that organosilyl-substituted primary and secondary amines may be produced by reacting chloro- and bromo-methyl-silicon compounds with ammonia in pressure vessels. However, the production of tris-(organosilylmethyl)amines has hitherto not been possible by this method, even using a hydrocarbon or alcohol as solvent (cf. loc. cit. column 1, lines 51 to 53, and U.S. patent specification No. 2,754,311, column 1, lines 60 to 71).

We have now found that these compounds can be prepared by introducing anhydrous ammonia into a solution of a bromomethylalkoxysilane of the general formula

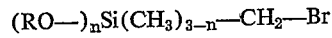

under atmospheric pressure, the solvent being a polar, but not proton-active, compound the dielectric constant of which is greater than 25 at 20° C., effecting reaction between these compounds at a temperature between —30° C. and the boiling point of the reaction mixture, preferably between 20 and 85° C., and separating the tris-amine from ammonium bromide and the solvent.

The reaction normally requires a reaction time of 4 to 16 hours, and suitably the introduction of two to seven times the stoichiometric amount of ammonia is distributed over this period of time. Suitable aprotonic, i.e. non proton-active, polar solvents include acetonitrile (dielectric constant=38.8), which is the preferred solvent, and also dimethyl formamide (37.6) and benzonitrile (25.6). In most cases lower yields are obtained with the latter two within the reaction times indicated than with acetonitrile.

The tris-(alkoxysila-alkyl)-amines of the general formula given above, which are obtained in this way, are liquids which are miscible with the usual organic solvents. In a continuation of the process, basic organosiloxanes may be obtained from these amines by hydrolysis and condensation and, in particular, reactive organoalkoxysiloxanes are obtained in the case of only partial hydrolysis. For this purpose, the tris-(organosilyl-methyl)-amine obtained from the first step of the process is mixed with the amount of water stoichiometrically calculated according to the reaction equation

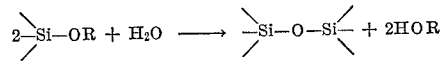

preferably amounting to 1 to 2 moles $H_2O$ per mole of amine, and the alcohol formed is distilled off. Due to internal condensation, use of a molar ratio of 1:1 leads mainly to the 2,6-disilamorpholine derivatives mentioned above, and these are further condensed intermolecularly to form siloxane polymers by the addition of larger amounts of water.

Similarly to the known organosilyl-alkylamines, the new tris-amines can be used as intermediates, as surfactants, and as bonding agents between resins and glasses. They have the advantage over the known compounds that they are more easily obtained, since the process for their production necessitates neither the expenditure for a process carried out under superatmospheric pressure nor the use of liquid ammonia, involving the risk of corrosion by the ammonium halide dissolved therein and reacting as an acid. The production of these new compounds can therefore be carried out in the usual glass or metal reaction vessels.

The following examples are given for the purpose of illustrating the invention.

EXAMPLE 1

4540 g. (20 moles) methyl-(bromomethyl)-diethoxysilane are dissolved in 8 litres of acetonitrile, and a current of 80 g./hour of ammonia, dried over potassium hydroxide, is passed into this solution through a glass frit at 80° C. for 12 hours while stirring. The reaction mixture is then filtered and, besides a filter residue of 20 moles ammonium bromide, there is obtained a bromine-free filtrate from which the solvent is distilled off at 0.5 mm. Hg and a maximum temperature of 80° C. There remain 2850 g. (95% of the theoretical amount) of tris-(methyl-diethoxysilylmethyl)-amine of the formula.

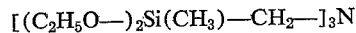

which can be confirmed by the nuclear magnetic resonance spectrum. Elementary analysis—Found (percent): Si, 17.8; C, 46.3; H, 10.05; N, 3.00. Calculated (percent): Si, 18.4; C, 47.5; H, 9.9; N, 3.08.

EXAMPLE 2

228 g. methyl-(bromomethyl)-di-n-propoxysilane are dissolved in 750 cc. acetonitrile and a current of 27 g./hour of ammonia (dried as in Example 1) is passed into this solution for 4½ hours, whereupon the temperature rises to 44° C. The precipitated ammonium bromide, which contains 90% of the initial amount of bromine, is then separated off by filtration of the reaction mixture. From the clear brown filtrate the solvent and unreacted silane are driven off as in Example 1, and there is obtained a bromine-free liquid residue of 114 g. (71% of the theoretical amount) of tris-(methyl-di-n-propoxy-silyl-methyl)-amine containing, according to elementary analysis (percent): Si, 16.4; C, 51.0; H, 10.4; N, 2.8. Calculated (percent): Si, 15.6; C, 53.5; H, 10.6; N, 2.6.

EXAMPLE 3

1 litre of acetonitrile is mixed with 283 g. methyl-(bromomethyl)-diisobutoxysilane and a current of 20 g./hr. of ammonia (dried as before) is passed through this mixture for 6 hours whereupon the temperature rises to 35° C. The precipitated ammonium bromide, which contains 92.5% of the initial amount of bromine, is then separated by filtration of the reaction mixture, and the brown filtrate is freed from acetonitrile and unreacted silane as in the preceding examples. There remain 131 g. (62% of the theoretical amount) of tris-(methyl-diisobutoxy-silyl-methyl)-amine containing, according to elementary analysis (percent): Si, 13.7; C, 55.6; H, 11.0; N, 2.6; Br, 0.6. Calculated (percent): Si, 13.5; C, 57.7; H, 11.05; N, 2.24.

EXAMPLE 4

1 litre of acetonitrile is mixed with 187 g. bromomethyl-dimethyl-ethoxysilane and a current of 15 g./hour of ammonia (dried as before) is passed into this mixture for 8 hours. The precipitated ammonium bromide (90% of the theoretical amount) is filtered off and the yellow-brown filtrate is freed from the solvent as in the preceding examples. As a thinly liquid residue there are obtained 98 g. (80% of the theoretical amount) of tris-(dimethyl-ethoxysilyl-methyl)-amine of the formula $$[C_2H_5O—Si(CH_3)_2—CH_2—]_3N$$

Elementary analysis thereof shows (percent): Si, 22.5; C, 48.9; H, 10.7; N, 4.1; traces of Br. Calculated (percent): Si, 23.0; C, 49.4; H, 10.68; N, 3.82.

EXAMPLE 5

40 g. of water are added with stirring to 1000 g. of the tris-(methyl-diethoxysilyl-methyl) - amine prepared according to Example 1, whereupon the temperature rises to approximately 40° C. 205 g. ethanol are then distilled off at 25° C. and 0.5 mm. Hg. The residue obtained is a thinly liquid product which is determined by analysis and infrared spectroscopy as 2,6-dimethyl-2,6-diethoxy-4-(methyl-diethoxysilyl-methyl)-2,6-disilamorpholine of the formula

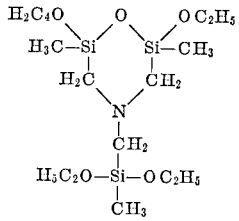

Analysis (percent): Si, 22.4; C, 42.8; H, 9.1; N, 4.0. Calculated (percent): Si, 22.1; C, 44.1; H, 9.2; N, 3.68.

EXAMPLE 6

3.5 g. of water are added with stirring to 70.2 g. of the tris-(dimethyl-ethoxysilyl-methyl) - amine prepared according to Example 4, whereupon the reaction mixture warms up to about 40° C. and acquires a golden yellow colour. It is subsequently heated at 60° C. for 30 minutes, in order to ensure complete reaction, and the ethanol formed during the reaction (about 17 g.) is then distilled off at this temperature with gradual reduction of the pressure to 12 mm. Hg. The residue, which is then slightly turbid, is filtered off and the filtrate fractionally distilled. There is obtained 2,6-tetramethyl-4-(dimethylethoxysilyl-methyl)-2,6-disilamorpholine as a water-clear distillate with boiling point 52° S./0.2 mm. Hg and refractive index $n_D^{20}=1.4376$; according to analysis, infrared spectrum, nuclear magnetic resonance spectrum and mass spectrum, its structure corresponds to the formula

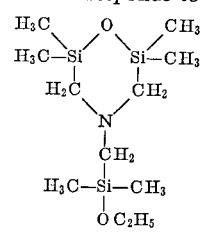

Analysis (percent): Si, 28.6; C, 44.9; H, 10.0; N, 5.0; Br, 0.3. Calculated (percent): Si, 28.85; C, 45.4; H, 10.0; N, 4.8.

What is claimed is:
1. Tris-(organosilyl-methyl)-amines of the general formula

$$[(RO—)_nSi(CH_3)_{3-n}—CH_2—]_3N$$

in which R is an alkyl radical having 1 to 4 carbon atoms and $n$ is an integer from 1 to 3.

2. Tris-(methyl-diethoxysilyl-methyl)-amine.
3. Tris-(methyl-di-n-propoxysilyl-methyl)-amine.
4. Tris-(methyl-diisobutoxysilyl-methyl)-amine.
5. Tris-(dimethyl-ethoxysilyl-methyl)-amine.
6. Process for the production of a tris-(organosilyl-methyl)-amine according to claim 1 which comprises introducing anhydrous ammonia into a solution of a bromomethyl-alkoxysilane of the general formula $$(RO—)_nSi(CH_3)_{3-n}—CH_2—Br$$

under atmospheric pressure, the solvent being a polar aprotonic compound the dielectric constant of which is greater than 25 at 20° C., effecting reaction between said ammonia and the said silane at a temperature between −30° C. and the boiling point of the reaction mixture, and separating the tris-amine from ammonium bromide and the solvent.

7. Process according to claim 6 wherein the solvent is acetonitrile.
8. Process according to claim 6 wherein the solvent is dimethyl formamide or benzonitrile.
9. Process according to claim 6 wherein reaction is effected at a temperature between 20 and 85° C.
10. Process according to claim 6 wherein said ammonia is introduced into the said silane in an amount of 2 to 7 times the stoichiometric amount over a period of 4 to 16 hours.

References Cited

UNITED STATES PATENTS

| | | | |
|---|---|---|---|
| 2,920,095 | 1/1960 | Jex et al. | 260—448.8 |
| 2,832,754 | 4/1958 | Jex et al. | 260—448.2X |
| 2,930,809 | 3/1960 | Jex et al. | 260—448.8 |
| 3,044,982 | 7/1962 | Jex et al. | 260—448.2X |
| 3,045,036 | 7/1962 | Jex et al. | 260—448.2 |
| 3,249,535 | 5/1966 | Keil | 260—448.2X |

OTHER REFERENCES

Zappel, Angewandte Chemie, 71 (1959), p. 521.

JAMES E. POER, Primary Examiner

W. F. W. BELLAMY, Assistant Examiner

U.S. Cl. X.R.

260—448.2N, 448.2E, 448.2D